United States Patent Office 3,076,312
Patented Feb. 5, 1963

3,076,312
FUEL SUPPLY CONTROL FOR GAS TURBINE ENGINES
Richard Woolliscroft Haigh, Harborough Bank, Shelsley Beauchamp, England, assignor to Joseph Lucas (Industries) Limited, Birmingham, England
Filed Jan. 23, 1961, Ser. No. 84,278
Claims priority, application Great Britain Jan. 29, 1960
7 Claims. (Cl. 60—39.28)

This invention relates to the control of the supply of fuel to the combustion chamber of a gas turbine engine.

In order to facilitate description of the invention, throughout this specification the actual speed of the engine at any time will be denoted by $Na$, the pressure and temperature of the air entering the engine compressor by $P$ and $T$ respectively, and the flow of fuel necessary to maintain the speed $Na$ by $F$. Further, where the engine is accelerating or decelerating, the speed it is desired to attain will be termed the desired speed.

Figure 2:
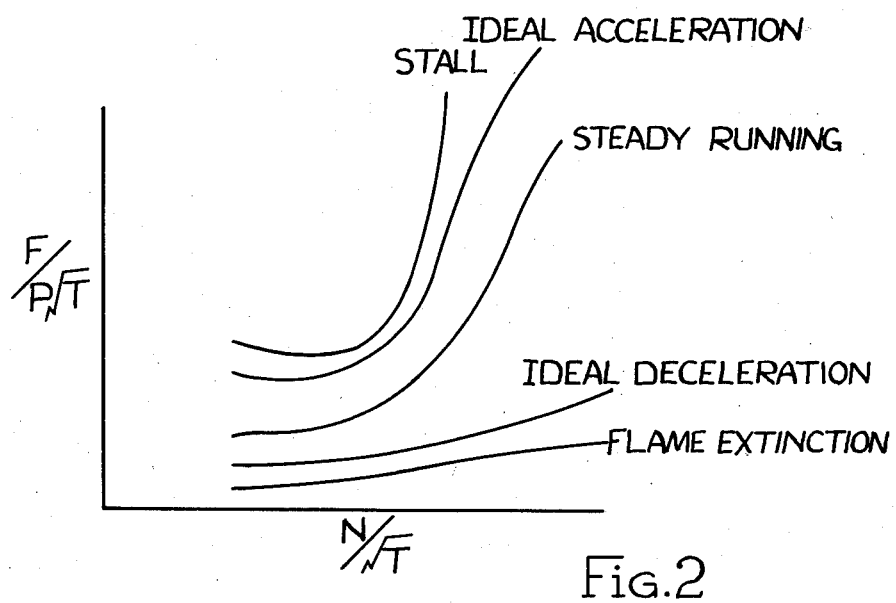

If, as shown in the accompanying FIGURE 2, a graph is drawn with co-ordinates $$\frac{F}{P\sqrt{T}}$$

and $$\frac{Na}{\sqrt{T}}$$

and a curve is drawn on the graph to represent steady running of the engine, it is found that, within small limits of error, this curve is independent of $P$ and $T$. As shown further curve can be drawn to represent stalling of the compressor as a result of over-rapid acceleration of the engine, whilst a third curve can be drawn to represent extinction of the flame during deceleration as a result of insufficient fuel supply.

In certain circumstances it is desirable to be able to cause the engine to accelerate or decelerate rapidly, and empirical curves may be drawn on the graph as shown to represent the maximum rates at which the engine can be accelerated or decelerated, whilst allowing a margin of error to prevent stalling of the engine. These curves will hereinafter be termed the ideal acceleration curve and the ideal deceleration curve respectively, and the speeds of the engine whilst on either ideal curve will be termed ideal speeds.

Considering first the ideal acceleration curve, let ideal speeds on this curve be denoted by $N_i$. If $\Delta F$ is the excess fuel required to accelerate the engine along the ideal acceleration curve, then, since $\Delta P$ and $\Delta T$ are very small quantities, we may write:

$$\frac{1}{P\sqrt{T}}\Delta F = g\left[\frac{Na}{\sqrt{T}}\right]$$

where $g$ is some function of the particular engine.

Empirically it is found that $$\frac{dN_i}{dt} = \phi\left[\frac{Na}{\sqrt{T}}\right]\Delta F$$

where $\phi$ is also a function of the engine.

Hence, substituting for $\Delta F$ $$\frac{1}{P\sqrt{T}}\frac{dN_i}{dt} = \phi\left[\frac{Na}{\sqrt{T}}\right]g\left[\frac{Na}{\sqrt{T}}\right]$$

Whence, substituting $f = \phi g$ and solving for $N_i$.

$$N_i = P\sqrt{T}\int f\left[\frac{Na}{\sqrt{T}}\right]dt \qquad (1)$$

This equation gives the speed of the engine at time "$t$" when the engine is being accelerated along the ideal acceleration curve.

In similar manner, if $N_i'$ is the ideal speed at any instant while the engine is decelerating along the ideal deceleration curve, then $$N_i' = P\sqrt{T}\int f'\left[\frac{Na}{\sqrt{T}}\right]dt \qquad (2)$$

where $f'$ is a different function of the engine.

The purpose of the present invention is to provide a control for maintaining the speed of an engine at the speed $N_i$ during acceleration and/or at the speed $N_i'$ during deceleration. For this purpose it is found in practice that by suitably adjusting the functions the term $\sqrt{T}$ in expressions 1 and 2 can be ignored to a first approximation.

A control in accordance with the invention comprises in combination means for producing a first electrical signal proportional to the actual speed of the engine, a controller which receives the first signal and a second signal, said controller serving to maintain the supply of fuel to the combustion chamber of the engine constant when the first and second signals have a predetermined relative magnitude but to increase or decrease the supply of fuel when they differ from the predetermined relative magnitude, a manually operable device for producing a third electrical signal proportional to the desired speed of the engine, and means for producing the second signal whereby the second signal will be related to the first signal when the actual speed and the desired speed are equal, but whereby the second signal will be substantially proportional to the ideal speed when the desired speed is greater than and/or when the desired speed is less than, the actual speed.

Figure 1:
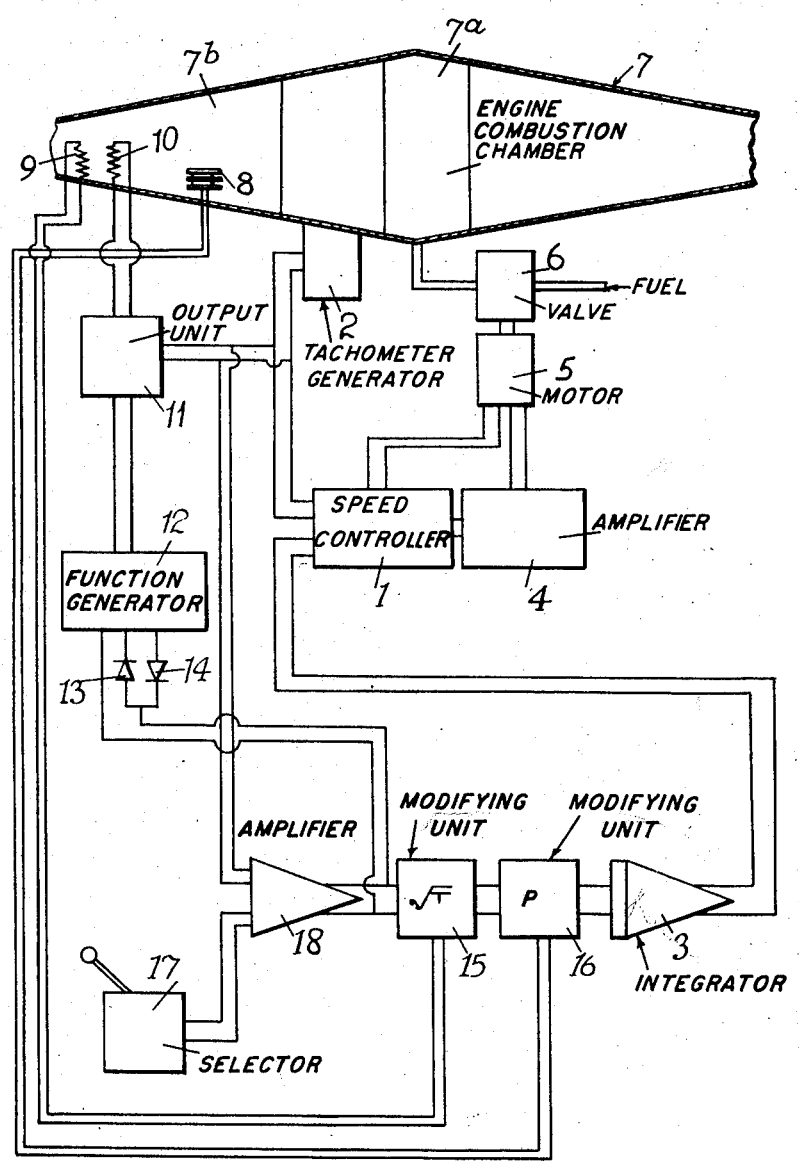

In the accompanying drawings FIGURE 1 is a diagrammatic view illustrating one example of the invention, whilst FIGURE 2 is a graph illustrating various curves already referred to in the specification.

Referring to the drawing there is provided a speed controller 1 which is fed from a tachometer generator 2 with a first electrical signal proportional to the actual speed $N_a$ of the engine, and also with a second signal from an integrator 3 to be referred to. The controller 1 serves through an amplifier 4 to control a motor 5 which in turn controls a valve 6 for controlling the supply of fuel to the combustion chamber $7^a$ of the engine 7. The motor 5 incorporates transducers producing signals dependent on the motor angle and velocity, and these signals are also fed to the controller 1 in order to stabilise the operation of the motor. The arrangement is such that when the first and second signals are equal (or when they have some other predetermined relative magnitude) the controller maintains the supply of fuel constant, but in the event of the second signal being greater or less than the first signal respectively the controller will increase or decrease the supply of fuel.

Within the engine air intake $7^b$ are mounted a pressure sensitive element 8 and a temperature sensitive resistance 9, for a purpose to be referred to, and a second resistance 10.

The resistance 10 will result in a signal dependent on temperature and this signal, together with the first signal from the generator 2 is fed to a unit 11 of any convenient form which produces an output proportional to $$\frac{Na}{\sqrt{T}}$$

This output is fed to a function generator 12 which comprises two parts. One of these parts produces the function $$f\left[\frac{Na}{\sqrt{T}}\right]$$

appearing in Equation 1 above, whilst the other part produces the function $$f'\left[\frac{Na}{\sqrt{T}}\right]$$

seen in Equation 2. A pair of diodes 13, 14 are provided and these ensure that at any instant only one of these functions can be passed on from the generator 12.

The output from the generator 12 is passed through units 15, 16 which are associated with the resistance 9 and the element 8 respectively. The unit 15 is of known form incorporating a resistor and a thermistor in parallel, the thermistor being the resistor 9 and the combinaion serving to modify the signal passing through the unit 15 by a factor $\sqrt{T}$. The unit 16 is a potentiometer having its slider driven by the bellows 8, the unit 16 modifying the signal by a factor P. The units 15, 16 modify the signal by factor $\sqrt{T}$ and P respectively, and the output from the unit 16 is fed to the integrator 3. This may be of any known form, and when it receives a signal from the unit 16 it produces an output which can be expressed by:

$$P\sqrt{T}\int h\left[\frac{Na}{\sqrt{T}}\right]dt$$

where $h$ is either the function $f$ or the function $f'$.

There is further provided a selector 17 operable by the pilot to produce a third signal proportional to the desired speed. The third signal is fed to an amplifier 18 which is also fed with the first signal, the amplifier 18 being arranged to produce an output only when these two signals differ.

The operation of the control is as follows:

If the pilot wishes to accelerate the engine he alters the selector 17 so that the desired speed is greater than the actual speed. The amplifier 18 now produces an output and permits the diode 13 to conduct. The resultant second signal will then be:

$$P\sqrt{T}\int f\left[\frac{Na}{\sqrt{T}}\right]dt$$

and the controller will adjust the fuel supply so that engine accelerates along or substantially along the ideal acceleration curve until the desired speed is achieved. At this point the output from the integrator will have become equal to the first signal so that the fuel flow is now maintained constant. Moreover, since the desired and actual speeds are now equal, there is no output from the amplifier 18, and neither of the diodes 13, 14 can conduct. There is thus no input to the integrator, which therefore continues to produce a signal which remains constant until the actual and desired speeds again become different.

When the pilot decelerates the engine, the diode 14 conducts and the function $f'$ is fed to the integrator 3. In this case the engine will be controlled to decelerate along or substantially along the ideal deceleration curve.

In a modification, instead of feeding the first signal to the amplifier 18 the output from the integrator may be fed thereto. It will be understood that this alteration does not alter the operation, since during periods when the engine is not accelerating or decelerating, the output from the integrator will equal the speed of the engine.

It will be understood that although in the example described the generator 12 is in two parts producing the functions $f$ and $f'$ respectively, the invention is applicable to control along the ideal acceleration curve only, or along the ideal deceleration curve only. Further, by suitable adjustment of the function or functions produced by the generator 12 the element 9 and unit 15 may be omitted.

Having thus described my invention what I claim as new and desire to secure by Letters Patent is:

1. A fuel supply control for a gas turbine engine having a compressor, comprising in combination pressure-sensitive means providing an electrical signal dependent on the pressure of air entering the compressor, temperature-sensitive means providing an electrical signal dependent on the temperature of air entering the compressor, speed-sensitive means providing an electrical signal dependent on the actual speed of the engine, function-generating means connected to the temperature-sensitive means and to the speed-sensitive means, and producing an output signal dependent on an empirically determined function of said speed and said temperature, signal modifying means connected to the output from the function generating means and to the pressure sensitive means, said signal modifying means producing an output signal dependent on said pressure and said empirically determined function, an integrator connected to said signal modifying means, said integrator producing an output which depends on said pressure and the integral of said function, and which is an empirically determined schedule of the engine speed such as will prevent stalling of the compressor, a controller connected to the speed-sensitive means and to the integrator output, means operable by said controller for varying the rate of supply of fuel to the engine when the relative magnitude of the signals received by the controller varies from a predetermined value, manually operable means producing a signal dependent on the desired speed of the engine, and means connected to said manually operable means for breaking electrical connection between the function generating means and the integrator, the output from said integrator then remaining constant until the actual and desired speeds are not equal and communication between the integrator and the function generating means is reestablished.

2. A fuel supply control system as claimed in claim 1, in which said controller varies the rate of flow to the engine when the input signals received by the controller are not equal.

3. A fuel supply control as claimed in claim 1 in which the function generating means produces a signal $$f\left(\frac{Na}{\sqrt{T}}\right)$$

where $Na$ and $T$ are said speed and temperature respectively, and the integrator produces a signal $$P\int f\left(\frac{Na}{\sqrt{T}}\right)$$

where $P$ is said pressure.

4. A fuel supply control as claimed in claim 3 and including a second signal modifying circuit connected between the function generating circuit and the integrator, and also connected to the temperature-sensitive means, said second modifying circuit modifying the input signal to the integrator so that the output signal from the integrator becomes $$P\sqrt{T}\int f\left(\frac{Na}{\sqrt{T}}\right)$$

5. A fuel supply control as claimed in claim 1 in which said means connected to said manually operable means is a difference amplifier which is connected in addition to said speed-sensitive means.

6. A fuel supply control as claimed in claim 1 in which said means connected to said manually operable means is a difference amplifier which is connected in addition to the integrator output.

7. A fuel supply control for a gas turbine engine having a compressor, comprising in combination pressure-sensitive means producing an electrical signal depending on the pressure P of air entering the compressor, speed-sensitive means providing an electrical signal dependent on the actual speed Na of the engine, temperature-sensitive means providing an electrical signal dependent on the temperature T of air entering the compressor, first function-generating means connected to the temperature-sensitive means and to the speed-sensitive means, and producing an output signal $$f\left(\frac{Na}{\sqrt{T}}\right)$$

where $f$ is an empirically determined function of the engine, second function-generating means connected to the temperature-sensitive means and to the speed sensitive means, and producing an output signal $$f^1\left(\frac{Na}{\sqrt{T}}\right)$$

where $f^1$ is a second empirically determined function of the engine, a modifying circuit connected to said pressure sensitive means and serving to modify signals passing therethrough by a factor P, first and second rectifiers through which the modifying circuit is connected to the outputs from the first and second function-generating means respectively, an integrator connected to the output from the modifying circuit, a controller connected to said speed-sensitive means and to the integrator output, means operable by the controller for varying the rate of supply of fuel to the engine when the signals received by the controller from the speed-sensitive means and the integrator are not equal, manually-operable means producing a signal dependent on the desired speed of the engine, a difference amplifier connected to the manually operable means and receiving also the signal Na, said difference amplifier being connected to a point intermediate the modifying circuit and the rectifiers for rendering the first rectifier and the second rectifier conductive when the actual speed is less than and greater than the desired speed respectively, said integrator producing signals $$P\int f\left(\frac{Na}{\sqrt{T}}\right)$$

and $$P\int f^1\left(\frac{Na}{\sqrt{T}}\right)$$

when the first and second rectifiers are conductive respectively and thereby allowing acceleration or deceleration of the engine in which the engine speed varies in accordance with empirical schedules predetermined by the functions $f$ and $f^1$ respectively so that stalling of the compressor is avoided, both rectifiers becoming non-conductive when the desired speed is attained and the integrator then continuing to produce a constant output until one of the rectifiers is again conductive.

References Cited in the file of this patent
UNITED STATES PATENTS

| | | |
|---|---|---|
| 2,857,739 | Wright | Oct. 28, 1958 |
| 2,933,130 | Wright | Apr. 19, 1960 |
| 2,971,574 | Kuzmitz | Feb. 14, 1961 |